Jan. 12, 1926.  
F. A. HEADSON  
PACKING  
Filed August 27, 1921

1,569,182

Witness:  
Inventor:  
Frank A. Headson.  
By Harry Irwin Cromer.  
Atty.

Patented Jan. 12, 1926.

1,569,182

UNITED STATES PATENT OFFICE.

FRANK A. HEADSON, OF MILWAUKEE, WISCONSIN.

PACKING.

Application filed August 27, 1921. Serial No. 496,054.

*To all whom it may concern:*

Be it known that I, FRANK A. HEADSON, a citizen of the United States, residing in Milwaukee, in the county of Milwaukee and State of Wisconsin, have invented certain new and useful Improvements in Packing; and I do hereby declare that the following is a full, clear, and exact description of the same.

This invention relates to an improved article of manufacture adapted to be used as a packing for packing piston rods or other moving rods or parts of engines or other machinery, or for other or similar purposes, and more particularly where a steam-tight or water-tight joint is to be maintained, or under conditions requiring such article to be subjected to friction or wear, or to varying conditions of moisture or temperature, or in contact with other parts or elements.

The principal object of the invention is to provide a simple, economical and efficient packing or article of manufacture adapted to be used as a packing, or as a friction member, or for other or similar purposes.

A further object is to provide a packing or article of manufacture adapted to be used as a packing, or as a friction member, or in contact with other parts or elements, and adapted to maintain a tight joint and to permit and withstand the effects of expansion and contraction due to variations in temperature, or to stresses and strains to which such article is subjected in use, and which is durable and efficient when subjected to wear, or to the effects of steam heat, moisture, compression, friction, or other conditions to which a packing or similar article is subjected; and particularly to provide such a packing or other article, formed of or comprising integral layers of flexible fibrous material folded so that all raw edges are infolded covered and protected from wear.

Other and further objects of the invention will appear from an examination of the following description and claims, and from an inspection of the accompanying drawings, which are made a part hereof.

The invention consists in the features, combinations, and details of construction herein described and claimed.

In the accompanying drawings:—

Figure 1:
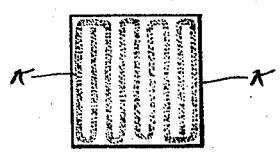
Figure 3:
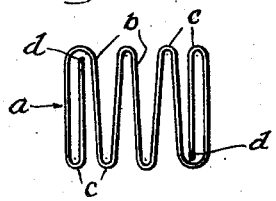
Figure 2:
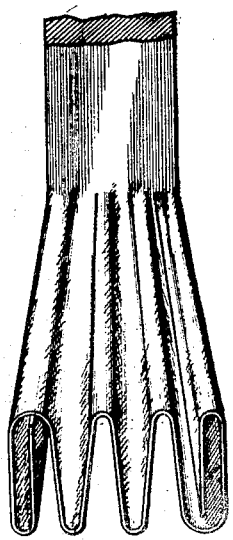
Figure 4:
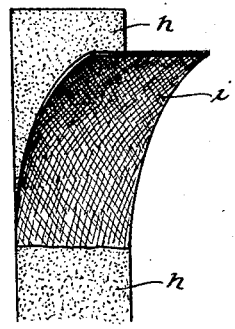
Figure 5:
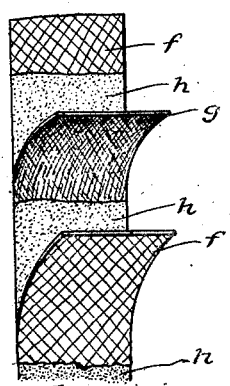
Figure 6:
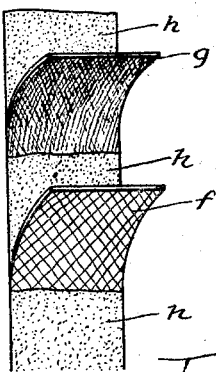

Figure 1 is a view in cross section of a strip, block or piece of packing made in accordance with my invention;

Fig. 2, is a view in perspective of a packing strip or piece of packing made in accordance with my invention; showing a portion of the packing as it would appear when completed or after having been folded and subjected to heat and pressure and molded into the desired form, and after having been removed from the molds; and also showing a portion of the sheet or folded material, as it would appear when folded into layers or folds which extend longitudinally of the piece or strip of packing, but with the folds somewhat separated, so as to show the manner of folding, and the relative positions of the layers and the integral folded marginal portions of the layers or folds, and the inwardly folded and covered raw, selvage or raveled or unfinished edges of the sheet material of which the packing is formed;

Fig. 3, is an end or transverse view in section of a strip or sheet of material folded to form a complete section of a strip or block of packing, but with the folds spread apart and showing the raw or unfinished or ravelable edges of the material folded inside of and covered by folded marginal portions or folded layers, so that the entire outer or exposed surface of the packing is formed of side surface portions of the material;

Fig. 4 is a plan or side view of a sheet of flexible material or fabric consisting of alternate layers of fabric or fibrous material and cement, with a coating or layer of cementitious material on each side of the layer of canvas, or fibrous material;

Fig. 5 is a similar view of a sheet or strip of laminated flexible fibrous material a layer or layers of asbestos, and a layer of organic material or fabric united by means of rubber cement or suitable cementitious material, and adapted to form a packing strip or sheet suitable for folding and molding into the form of a packing embodying my invention; and Fig. 6, is a similar view of a sheet or strip of fibrous material comprising a sheet or layer of asbestos having a layer of rubber cement or cementitious material on each side of and in adhesive engagement with the asbestos; and also showing a layer of organic material or fabric which may be a sheet of cloth or canvas having layers of cementitious material in adhesive contact with the opposite side surfaces thereof, and which may be used with the layer of asbestos if desired; or the canvas may be omitted if desired.

In making a packing in accordance with my invention, I provide one or more sheets or strips *a* of suitable flexible fibrous material which may be in the form of a woven fabric or of felted material, and fold the same in such a manner as to form a plurality or series of longitudinal layers or folds, plaits or plies *b*, each having a folded longitudinal marginal portion or connecting fold *c* connected or in one integral piece with the next adjacent layer or fold *b*.

Each sheet *a*, thus folded, has its opposite longitudinal marginal edges *d* infolded between and inclosed and covered throughout the entire length of the sheet and throughout the entire length of the laminated packing by adjacent connected layers or lamina *b*, each of which has an integral longitudinal marginal portion or connecting fold *c* connected or in one integral piece with the longitudinal marginal fold or folded marginal portion of the next adjacent layer *b*. A longitudinal marginal fold *c* is thus formed on the outside of and in position to inclose and cover each of the opposite or longitudinal edges *d* of the folded sheet *a*. (See Figs. 1, 2, and 3.)

The sheet or sheets *a* may consist of or comprise a sheet or layer of fibrous material containing asbestos or formed of fibrous asbestos either felted or woven in the form of a fabric or asbestos cloth, with or without fibrous organic material, and having cementitious material containing rubber interposed between the folds *b* and between the lamina of which the sheet is formed, in case a liminated sheet is employed. Or the sheet may consist of or comprise fibrous organic material either woven in the form of a fabric or felted, and folded with the edges of the sheet infolded between adjacent parallel connected layers *b*, and with cementitious material containing rubber interposed between the layers, and compressed into the form of an angular packing strip and vulcanized. Or a sheet of fibrous asbestos and a sheet of organic fibrous material, either or both in the form of a woven fabric, or either or both in the form of a felted sheet or sheets in adhesive contact, folded as described, and vulcanized and compressed into the form of a rectangular or approximately rectangular packing strip may be employed.

The folded sheet of flexible fibrous material *a*, which is shown in Figs. 1 to 3 inclusive, may, for example, be formed of a layer *f* of fibrous asbestos or containing fibrous asbestos in the form of a woven fabric, and a layer *g* of organic material either woven in the form of a fabric or felted, and having a layer or layers of cementitious material *h* containing rubber and sulphur therebetween, all compressed and vulcanized after being folded in the manner shown in Fig. 3. (See Fig. 6.)

Or the sheet of flexible fibrous material may consist of or comprise a plurality of layers of fibrous asbestos *f* woven in the form of a fabric as shown in Fig. 5, with the woven strands of fibrous asbestos diagonal or oblique with respect to the packing strip and with respect to the strands of organic woven fibrous material or canvas *g* shown in said Figure 5 and located between the asbestos layers *f*, *f*, and provided with a coating or layer of glue, rubber cement, or cementitious material containing rubber and sulphur *h* between and in adhesive contact with and adhesively connecting the layers *f* and *g*. Or the layers *f* and *g* or either of them may be of felted material.

The fibrous organic material, whether of canvas or felted, may consist of or comprise cotton, linen, jute or similar fibrous material, and may be employed with or without fibrous asbestos in the same layer in the sheet.

Or the sheet may comprise or consist of a layer or sheet *i* of fibrous asbestos either in the form of a fabric, or in non-woven or felted form, or may be formed of any suitable fibrous material either containing fibrous asbestos, or organic fibrous material, or both fibrous asbestos and fibrous organic material either woven in the form of a fabric or in felted form, and having cementitious material *h* containing rubber and sulphur in adhesive contact with one one both sides of such layer or sheet *i* as shown in Fig. 4, such sheet being cut to form a sheet or sheets *a*, which may be folded as shown in Figs. 1 to 3 inclusive, and compressed and vulcanized.

In each instance, however, the edges *d* of the sheet are infolded between adjacent layers *b* which are integrally connected by longitudinal marginal folds *c* which inclose and cover and protect the raw edges *d* of the sheet; and cement *h* containing rubber, is interposed between the layers or lamina, or applied to one or both sides thereof, and permeates the material, the whole structure being compressed and vulcanized.

The material to be compressed and vulcanized may be folded as shown in Figs. 1, 2, and 3, and passed between rolls, at the same time applying the required degree of heat and pressure to cause the rubber cement,—or cementitious material containing rubber and sulphur in suitable proportions for vulcanizing, which are well known to those skilled in the art,—to become vulcanized or partially vulcanized, and form a compressed angular vulcanized but flexible packing or packing strip. Or any desired ordinary and well known form of molds adapted to enable the required pressure and heat to be applied, may be employed.

A very desirable form of packing is made by thus folding the layers or lamina formed by the laminated sheet so that an angular or rectangular flexible laminated packing strip folded as shown in Figs. 1, 2 and 3, is obtained, in which the layers or adhesively connected lamina *b* are parallel and extend transversely across the rectangular strip or packing in approximately rectangular relation to opposite parallel outer surfaces of the packing strip formed by the integral folded longitudinal marginal portions or marginal folds *c* which extend longitudinally of the strip of packing on opposite approximately parallel sides thereof. The opposite longitudinal marginal edges *d* of the folded sheet of fibrous material are thus interposed and infolded within and between adjacent parallel layers *b*, and within and in position to be inclosed and shielded and covered by integral longitudinal marginal folds *c* and said layers *b* which are in adhesive contact with each other and with the infolded margins or edges of the sheet. The entire outer surface of the packing, in its angular or rectangular form, or in any form in which the marginal edges of the sheet are thus infolded, inclosed and covered, is thus formed by side surface portions of the sheet consisting of or comprising fibrous material in felted form or woven and forming a fabric, or a sheet of flexible fibrous material forming marginal folds *c* on opposite sides of the packing, and surfaces *k* at right angles, or at suitable angles to the side surfaces formed by the longitudinal marginal folds *c*, preferably forming a rectangular strip.

The packing is thus adapted to expand and contract to the desired extent and uniformly, and is adapted to maintain a steam-tight or water-tight joint under varying conditions of temperature and without becoming injured or being rendered inefficient by reason of such expansion and contraction, or by reason of the heat or varying degrees of moisture to which the packing is or may be exposed, or by reason of the stresses and strains and friction and wear to which it is subjected in use.

In Fig. 5 is shown a very desirable form of laminated sheet adapted to be folded so as to form a packing as above described, the laminated sheet there shown consisting of two layers of asbestos *f*, each of which is, by preference, woven so as to form an asbestos fabric or cloth. A layer of organic flexible fibrous material *g*, which may be of fabric or in the form of a felted sheet or layer made of cotton, linen, jute, or similar material, preferably woven, is laid between the layers *f* or in position to be cemented to one or both of the layers *f*, and the layers *f* and *g* are held together by means of a coating of glue, rubber cement, or cementitious material *h*, all of said elements being subjected to heat and pressure sufficient to cause the cementitious material to permeate the interstices of the layers *f* and *g*, which are thus, by preference, so disposed that the outer surfaces of the laminated sheet and of the packing are formed wholly of the asbestos layers or outer layers of refractory material. The organic, relatively strong fibrous material or fabric *g* being, by preference, between and covered and inclosed and shielded by the outer layers of asbestos or refractory material, is adapted to strengthen the sheet, and is shielded from coming in contact with any surface against which the packing is used. The asbestos thus forms an anti-friction bearing surface of refractory material which is not liable to become over-heated, and is adapted to be kept thoroughly lubricated while subjected to great heat, which it is well adapted to withstand.

The infolded opposite longitudinal edges of the sheet being thus covered, shielded and protected by the refractory asbestos layers of marginal longitudinal folds *c*, which folds are thus strengthened, and the wearing away thereof prevented by the inner layers *g* of organic material or fabric, it will be readily seen that only such surfaces are left exposed as are best adapted to enable proper lubrication to be maintained, and the action of heat and moisture to be withstood in an efficient manner, and that no raw or unfinished or rough edges are left exposed, to be worn away by friction or wear, or by exposure to varying conditions of moisture and of temperature.

The required heat and pressure having been applied to the folded fibrous material or sheet having cementitious material containing rubber and sulphur in a plastic condition between and in adhesive contact with the folded layers while the material is compressed in a suitably heated mold, which may be of any ordinary and well known form, or by passing the folded fibrous material between suitable compression rolls, and subjecting the material to the required heat and pressure to vulcanize the rubber cement, the material is allowed to set, and a flexible vulcanized or semi-vulcanized packing of fibrous material having no exposed raw edge in any part of the exposed surface thereof is obtained.

I claim:

1. A quadrangular packing comprising in its construction a folded sheet forming a plurality of layers of flexible material in adhesive engagement with each other, each of said layers having an integral folded marginal portion which is integral with the next adjacent layer and extends longitudinally of the packing strip, the longitudinal marginal edges of said sheet being infolded between and inclosed and covered by adjacent marginally connected layers of the packing, and having an intermediate adhesively connected layer extending between and separating said infolded longitudinal marginal edges.

2. A quadrangular packing comprising a folded sheet forming a plurality of layers of flexible material in adhesive engagement with each other, said layers being parallel to each other and disposed at an angle to opposite parallel side faces of the packing, each of said layers having an integral folded marginal portion integral with the next adjacent layer and extending longitudinally of the angular packing strip, the longitudinal marginal edges of said sheet being folded in between and in abutting engagement with and enclosed and covered by connected marginal portions of a plurality of said connected layers, and having a plurality of intermediate connected layers extending between and separating said infolded longitudinal marginal edges.

3. A quadrangular packing comprising a folded sheet of flexible material containing fibrous asbestos forming a plurality of parallel layers each disposed at right angles to an outer surface of the packing, each of said layers having an integral folded marginal portion integral with the next adjacent layer and extending longitudinally of the packing strip, cementitious material interposed between and adhesively connecting said layers, the longitudinal marginal edges of said sheet being infolded between and adhesively connected with and covered by adjacent connected layers of the packing and having a plurality of intermediate marginally connected layers extending between and separating said infolded longitudinal marginal edges of said sheet.

4. A quadrangular packing comprising a folded sheet of flexible material containing fibrous asbestos forming a plurality of parallel layers each disposed at right angles to opposite outer surfaces of the packing, each of said layers having an integral folded marginal portion integral with the next adjacent layer and extending longitudinally of the angular packing strip, cementitious material containing rubber and sulphur interposed between and adhesively connecting said layers, the marginal edges of said sheet being infolded between and inclosed and covered by adjacent connected layers of said folded fibrous material and having a plurality of intermediate marginally connected layers extending between and separating said infolded longitudinal marginal edges of said sheet, all compressed together and vulcanized.

5. An angular packing comprising a folded sheet of flexible material containing fibrous asbestos and organic fibrous material forming a plurality of parallel layers each disposed at right angles to opposite outer surfaces of the packing, each of said layers having an integral folded marginal portion integral with the next adjacent layer and extending longitudinally of the angular packing strip, cementitious material containing rubber interposed between and adhesively connecting said layers, the longitudinal marginal edges of said sheet being interposed between and infolded and covered by adjacent marginally connected layers of said folded fibrous material and having an intermediate layer extending between and separating said infolded longitudinal marginal edges of said sheet, all compressed together and vulcanized.

6. An angular packing comprising a folded laminated sheet having a plurality of layers of fibrous material containing asbestos and a layer of fabric containing organic fibrous material, said folded sheet forming a plurality of parallel layers each having an integral folded marginal portion integral with the next adjacent layer and extending longitudinally of the angular packing strip, cementitious material containing rubber interposed between and adhesively connecting said layers, the rough marginal edges of said sheet being infolded between and covered by adjacent marginally connected layers of said folded fibrous material and having a plurality of intermediate marginally connected layers extending between and separating said infolded longitudinal marginal edges of said sheet, all compressed together and vulcanized.

Signed at Chicago, in the county of Cook and State of Illinois, this 9th day of August, 1921.

FRANK A. HEADSON.